United States Patent [19]
Engel et al.

[11] Patent Number: 4,523,548
[45] Date of Patent: Jun. 18, 1985

[54] GASEOUS HYDROCARBON FUEL STORAGE SYSTEM AND POWER PLANT FOR VEHICLES

[75] Inventors: Larry J. Engel, Rochester; John W. Turko, River Rouge, both of Mich.

[73] Assignee: Michigan Consolidated Gas Company, Detroit, Mich.

[21] Appl. No.: 484,520

[22] Filed: Apr. 13, 1983

[51] Int. Cl.³ .............................................. F02B 43/00
[52] U.S. Cl. .................................... 123/1 A; 123/527; 123/528; 48/190
[58] Field of Search ............... 123/1 A, 525, 527, 559, 123/528; 48/190; 206/0.6, 0.7

[56] References Cited

U.S. PATENT DOCUMENTS

| | | | |
|---|---|---|---|
| 2,681,167 | 6/1954 | Weisz | 222/3 |
| 2,712,730 | 7/1955 | Spangler | 48/190 |
| 2,882,243 | 4/1959 | Milton | 252/455 X |
| 3,688,755 | 9/1972 | Grayson et al. | 123/527 |
| 3,719,196 | 3/1973 | McJones | 137/256 |
| 3,789,820 | 2/1974 | Douglas et al. | 123/1 A |
| 3,807,422 | 4/1974 | McJones | 137/256 |
| 3,844,306 | 10/1974 | Hill | 222/6 |
| 3,847,173 | 11/1974 | Hill | 222/6 |
| 3,849,086 | 11/1974 | Johnson | 123/559 |
| 3,906,915 | 9/1975 | Bednarczyk et al. | 123/3 |
| 3,926,168 | 12/1975 | Csicsery | 123/3 |
| 3,960,769 | 6/1976 | Munzner et al. | 252/445 |
| 4,016,836 | 4/1977 | MacKay et al. | 123/1 A |
| 4,046,709 | 9/1977 | Yuki | 252/445 |
| 4,068,639 | 1/1978 | Cook | 123/1 A |
| 4,167,920 | 9/1979 | Lepera et al. | 123/1 A |
| 4,178,882 | 12/1979 | Anderson et al. | 123/1 A |
| 4,225,320 | 9/1980 | Gell | 206/0.6 |
| 4,227,497 | 10/1980 | Mathieson | 123/525 |
| 4,253,428 | 3/1981 | Billings et al. | 123/1 A |
| 4,287,166 | 9/1981 | Dwyer | 252/455 Z |
| 4,341,234 | 7/1982 | Meinass et al. | 222/6 |
| 4,343,770 | 8/1982 | Simons | 206/0.7 |
| 4,433,664 | 2/1984 | Rodrigues | 123/527 |

FOREIGN PATENT DOCUMENTS 162226  12/1981  Japan .................................. 123/1 A

OTHER PUBLICATIONS

"The Quest for Alternative Fuels," Detroit Engineer, Nov. 1983, pp. 6-9.
"Sorbent-Containing Storage Systems for Natural Gas Powered Vehicles" by Amos Golovoy, Ford Motor Company, Dearborn, Mich.
"Properties of Natural Zeolites", U.S. Dept. of the Interior, RI 7744, Bureau of Mines Report of Investigations/1973.

(List continued on next page.)

Primary Examiner—E. Rollins Cross
Attorney, Agent, or Firm—Harness, Dickey & Pierce

[57] ABSTRACT

A low pressure gaseous hydrocarbon fuel storage system and power plant is described, which generally comprises means for storing a self-contained supply of a gaseous hydrocarbon fuel, a prime mover, means for conveying the gaseous hydrocarbon fuel to and from the storing means, and means for controlling the flow of the gaseous hydrocarbon fuel from the storing means to the prime mover. The storing means, which may include one or more vessels or cylinders, contains a predetermined sorbent material for reducing the pressure at which a given amount of the gaseous hydrocarbon fuel is stored. The prime mover, such as an internal combustion engine, has means for combining the gaseous hydrocarbon fuel with air to produce the mechanical energy therefrom necessary to move the vehicle. The conveying means is adapted to convey the gaseous hydrocarbon fuel to the storing means from a stationary source of the gaseous hydrocarbon fuel, and also to convey the gaseous hydrocarbon fuel from the storing means to the combining means of the prime mover during the operation of the vehicle. In the preferred embodiment, the maximum pressure at which the gaseous hydrocarbon fuel is stored in the storing means is in the range of approximately 100 psig (689 kPa) to approximately 400 psig (2760 kPa).

45 Claims, 13 Drawing Figures

OTHER PUBLICATIONS

"Natural Gas Storage With Zeolites" by Ronald A. Munson and Robert A. Clifton, Jr.-Bureau of Mines Nonmetallic Minerals Program, U.S. Dept. Interior, 8/71.

"Natural Zeolites: Their Properties, Occurrences, and Uses"-R. A. Munson and R. A. Sheppard, Minerals Science and Engineering-Jan. 1974.

"Low Pressure Methane Storage System for Vehicles--Preliminary Concept Evaluation"-J. Braslaw, J. Nasea, Jr. and A. Golovoy, Ford Motor Co., MI-1/82.

"Hydrogen As An Automotive Fuel": by Jim Epperson, Michigan Technic-Apr. 1974, (pp. 6-7).

"Are Other Concepts Pushing Diesels Into Background At Ford?" by Al Wrigley-Automotive Diesel Progress, Aug. 1981.

S.A.E. Technical Paper 830382, "On-Board Storage and Home Refueling Options for Natural Gas Vehicles" by A. Golovoy and J. Braslaw, published and presented by S.A.E. International Congress & Exposition in Det., MI, 2/28-3/4/83.

"Compressed Natural Gas (CNG): A Vehicle Fuel For Utility Company Fleets-The Pros and Cons"-American Gas Association-Feb. 1982.

"Assessment of Methane-Related Fuels For Automotive Fleet Vehicles"-U.S. Dept. of Energy-Feb. 1982, pp. 2-1 through 2-41; 3-1 through 3-21; and 9-1 through 9-4, (vol. 2 of 3 volumes).

"Assessment of Methane-Related Fuels For Automotive Fleet Vehicles"-U.S. Dept. of Energy-Feb. 1982-pp. D1 through D6, (vol. 3 of 3 volumes).

"Assessment of Methane-Related Fuels For Automotive Fleet Vehicles"-U.S. Dept. of Energy-Feb. 1982-vol. 1 of 3 volumes.

"State-of-the-Art Assessment of Methane-Fueled Vehicles"-U.S. Dept of Energy, Feb. 1982-DOE/-CE-0026.

"Adsorption of Methane On Active Carbons and Zeolites" by K. Otto, Ford Motor Company, Dearborn, Mich.

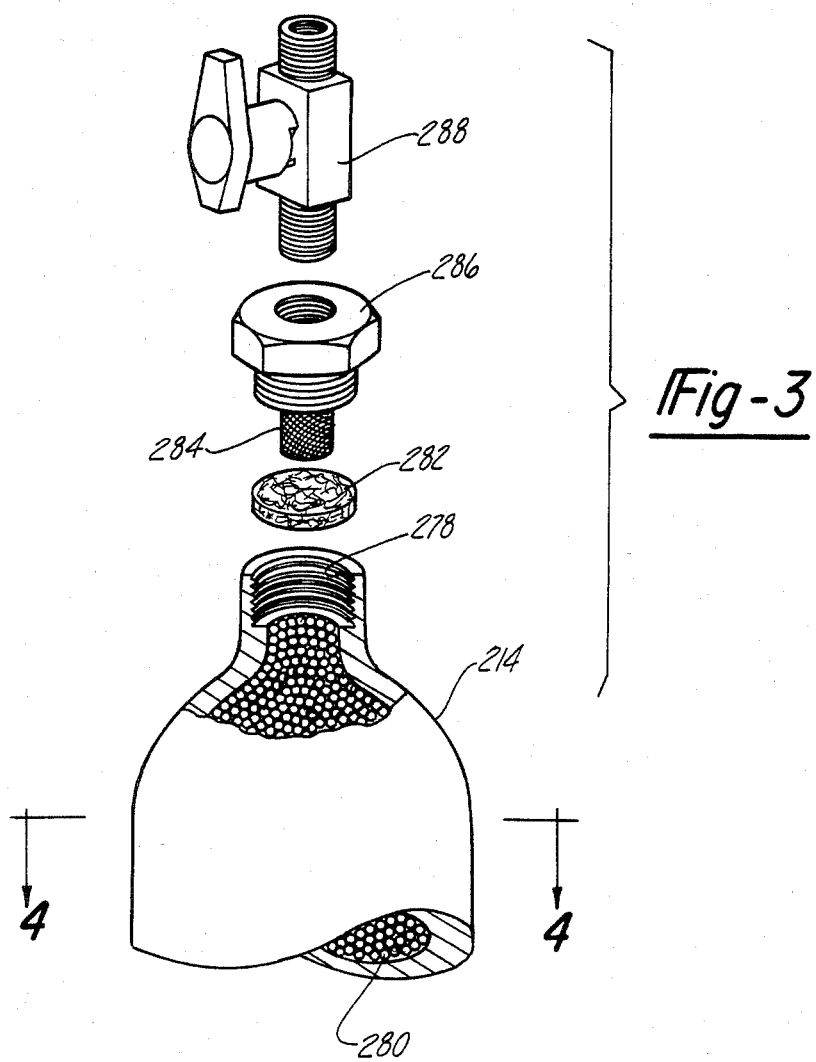
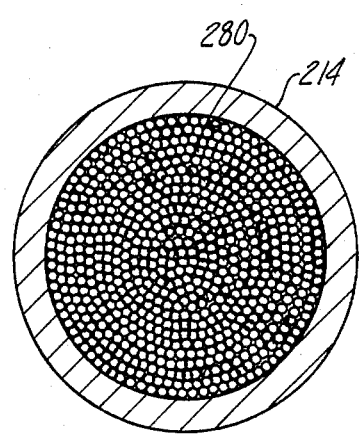

GASEOUS HYDROCARBON FUEL STORAGE SYSTEM AND POWER PLANT FOR VEHICLES

BACKGROUND AND SUMMARY OF THE INVENTION

The invention relates generally to transportation vehicles or other devices powered by natural gas or other gaseous fuels stored at low-pressure. More particularly, the invention relates to such vehicles or devices having fuel storage apparatus employing sorbent materials (adsorbents and/or absorbents) and also to refueling apparatus for such vehicles.

Over the years, concerns have developed over the availability of conventional fuels (such as gasoline or diesel fuel) for internal combustion engine vehicles, the operating costs and fuel efficiencies of such vehicles, and the potentially adverse effects of vehicle emissions on the environment. Because of such concern, much emphasis has been placed on the development of alternatives to such conventional vehicle fuels. One area of such emphasis has been the development of vehicles fueled by natural gas or other methane-type gaseous fuels, either as the sole fuel or as one fuel in a dual-fuel system. As a result, vehicles using such fuels have been produced and are currently in use both domestically and abroad.

For example, it has been estimated that as many as 275,000 natural gas powered vehicles are currently in use in Italy alone. Indeed, natural gas has been used continuously in Italy as a motive fuel for at least 40 years. Natural gas has also been used as a motive fuel for vehicles in several other foreign countries, including France, New Zealand, Canada, Iran, Australia, Holland and the United Kingdom.

In the United States, it has been estimated that approximately 20,000 vehicles presently use natural gas. One of the initial efforts to employ natural gas as a vehicular fuel is represented by the Southern California Gas Company's conversion of approximately 1000 vehicles to a compressed natural gas (CNG) fueling system during 1969 and 1970. Today, dual-fuel conversion systems which enable an otherwise conventional vehicle to operate on either gasoline or natural gas are commercially available from several domestic and foreign manufacturers. While conversion kits to permit an otherwise conventional vehicle to operate solely on natural gas are not known to be generally commercially available, the Ford Motor Company has recently built a demonstration vehicle of this kind. This vehicle is based upon a Ford LN7 model 2-passenger automobile, and includes lightweight storage cylinders which are used to store a self-contained supply of natural gas.

A more detailed discussion of the development and use of natural gas as a motive fuel for vehicles may be found in the following publications, which are hereby incorporated by reference: "Compressed Natural Gas (CNG): A Vehicle Fuel for Utility Company Fleets—the Pros and Cons", American Gas Association, an operating section report issued February 1982; "Assessment of Methane-Related Fuels for Automotive Fleet Vehicles", prepared for the Department of Energy (DOE/CE/50179-1) by The Aerospace Corporation, February 1982.

In order to provide such gaseous fueled vehicles with a reasonable range of travel between refuelings, it has previously been necessary to store the on-board gaseous fuel at very high pressures, generally in the range of approximately, 2000 psig (13.7 MPa) to 3000 psig (20.7 MPa). Without such high-pressure on-board storage, the practical storage capacity of such vehicles was limited because of space and weight factors to the energy equivalent of approximately one to five gallons (3.7 to 19 liters,) of conventional gasoline. Thus, by compressing the gaseous fuel to such high pressures, the on-board storage capacities of such vehicles were increased to the point that reasonable travel ranges between refuelings were attainable.

One disadvantage of the compressed gaseous fuel systems discussed above is that they require complex, expensive and time-consuming refueling apparatus in order to compress the fuel to such high pressures. Such refueling apparatus has been found to effectively preclude refueling the vehicle from a user's residential natural gas supply system as being commercially impractical on an individual ownership basis.

Another disadvantage of high pressure on-board natural gas storage systems is that heavy walled containers must typically be used, thereby increasing the cost and weight of the system. Additionally, as the cylinders are discharged during the operation of the vehicle, significant condensation on associated piping can occur as a result of the magnitude of the decrease in the pressure inside the cylinder.

Another alternative to the above discussed fuel storage and vehicle range problems, has been to store the on-board fuel in a liquid state generally at or near atmospheric pressure in order to allow sufficient quantities of fuel to be carried on board the vehicles to provide reasonable travel ranges between refuelings. Such liquefied gas storage may also be disadvantageous if it involves complex and expensive cryogenic equipment, both on board the vehicle and in the refueling station, in order to establish and maintain the necessary low gas temperatures.

In non-vehicular gaseous fuel storage applications for stationary installations, it has been found that the use of high-surface-area adsorptive materials has provided for significantly increased storage capacities at relatively low pressures. Such adsorptive materials typically include zeolites, activated carbons and silica gels. For example, the Spangler U.S. Pat. No. 2,712,730, issued on July 12, 1955, discloses a method and apparatus for storing various types of (liquefied) hydrocarbon gases which utilizes an adsorbent in order to increase the storage capacity of the stationary system.

In vehicular applications, the use of high-surface-area materials to adsorb natural gas was suggested as a potential means for increasing the on-board gas storage capacity at least as early as August 1971, in a report entitled "Natural Gas Storage With Zeolites". This report by Ronald A. Munson and Robert a Clifton, Jr. was published by the U.S. Department Of The Interior, Bureau of Mines (technical progress report 38), and is hereby incorporated by reference. A preliminary analysis of this concept was also presented in Section 2.2.3 of the "Assessment of Methane-Related Fuels for Automotive Fleet Vehicles" report identified above. The calculations used in this analysis indicated that a natural gas storage system utilizing adsorption would weigh approximately twice as much as a conventional high-pressure natural gas storage system.

The extent to which research efforts have been directed to developing a vehicular adsorption fuel storage system are exemplified by the recent efforts of the Ford Motor Company. Two papers were presented at the Fourth International Conference on Alternative Energy Sources, Miami Beach, Fla., December 1981, namely "Adsorption of Methane on Active Carbons and Zeolites" by K. Otto, and "Low Pressure Methane Storage Systems For Vehicles—Preliminary Concept Evaluation" by J. Braslow et al, which are both hereby incorporated by reference. These papers discussed laboratory experiments directed to determining the effect of the heat of methane adsorption on carbon capacity and the limitations of methane storage by adsorption.

Significantly, in Ford's most recent paper it was concluded that for on-board methane storage "the preferred option is to store the gaseous fuel at high pressures, e.g. 17 MPa [2500 psig] or higher, without the use of sorbents". Indeed, it was also stated that "it is difficult to imagine on-board methane storage below about 17 MPa, unless a very good sorbent is employed". This paper entitled "Sorbent-Containing Storage Systems For Natural Gas Powered Vehicles" by Amos Golovoy, was presented at a meeting of the Society of Automotive Engineers, Detroit, Mich., February 1983, and is hereby incorporated by reference.

Accordingly, in spite of significant and extensive research and development efforts in the area of gaseous fuel powered vehicles, no natural gas fuel storage or refueling systems have emerged that apply adsorptive storage technology to on-board vehicular storage and to their refueling apparatus. In fact, the above-discussed compressed natural gas and liquefied natural gas systems have been generally regarded as the only two feasible systems for natural gas powered vehicle applications.

The need has thus arisen for a hydrocarbon gaseous fuel powered vehicle that is capable of providing reasonable quantities of on-board fuel storage at relatively low pressures, and for practical and inexpensive refueling apparatus allowing such a vehicle to be refueled by the user from a residential natural gas supply system.

One of the primary objectives of the present invention is to provide a low pressure gaseous hydrocarbon fuel storage system and power plant for a vehicle in which sorption is used to reduce the pressure at which the gaseous hydrocarbon fuel is stored.

Another objective of the present invention is to provide a low pressure gaseous hydrocarbon fuel stored system and power plant in which the gaseous hydrocarbon fuel is sorptively filtered before being conveyed to a storage means on-board the vehicle. A related objective is to provide an sorptive filter which is self-cleaning during the operation of the vehicle.

A further objective of the present invention is to provide a low pressure gaseous hydrocarbon fuel storage system and power plant which is capable of utilizing a plurality of storage vessels in order to provide a self-contained supply of the gaseous hydrocarbon fuel on board the vehicle.

An additional objective of the present invention is to provide a low pressure gaseous hydrocarbon fuel storage system and power plant which is capable of being utilized in both single fuel and dual fuel supply systems.

It is yet another objective of the present invention to provide a low pressure gaseous hydrocarbon fuel storage system and power plant which is capable of being charged from either a high pressure or low pressure stationary source of the gaseous hydrocarbon fuel.

It is a more specific objective of the present invention to provide a vehicular natural gas storage system and power plant which is economical, operates at pressures below 500 psig, (3450 kPa) and also provides for a reasonable driving range.

To achieve the foregoing objectives, the present invention provides a low pressure gaseous hydrocarbon fuel storage system and power plant, which generally comprises means for storing a self-contained supply of the gaseous hydrocarbon fuel, a prime mover, means for conveying the gaseous hydrocarbon fuel to and from the storing means, and means for controlling the flow of the gaseous hydrocarbon fuel from the storing means to the prime mover. The storing means, which may include one or more vessels or cylinders, contains a predetermined sorbent material for reducing the pressure at which a given amount of the gaseous hydrocarbon fuel is stored. The prime mover, such as an internal combustion engine, has means for combining the gaseous hydrocarbon fuel with air to produce the mechanical energy therefrom necessary to move the vehicle. The conveying means is adapted to convey the gaseous hydrocarbon fuel to the storing means from a stationary source of the gaseous hydrocarbon fuel, and also to convey the gaseous hydrocarbon fuel from the storing means to the combining means of the prime mover during the operation of the vehicle. In the preferred embodiment, the maximum pressure at which the gaseous hydrocarbon fuel is stored in the storing means is in the range of approximately 100 psig (689 kPa) to approximately 400 psig (2760 kPa).

One of the significant advantages of the present invention is the use of a sorptive filter which is interposed in the conveying means between the storage means and the prime mover. When the vehicle fuel storage system is being charged, this filter sorptively removes predetermined constituents from the gaseous hydrocarbon fuel before the gaseous hydrocarbon fuel is conveyed to the storing means. Subsequently, when the prime mover is energized and the gaseous hydrocarbon fuel is conveyed from the storage means to the prime mover for consumption therein, the filter desorptively reintroduces the removed predetermined constituents to the flow of the gaseous hydrocarbon fuel being conveyed to the prime mover. Accordingly, the adsorptive filter not only prevents certain undesirable fuel constituents or contaminants from being introduced into the storage means, but it also operates as a self-cleaning or regenerative filter during the operation of the vehicle.

Another significant aspect of the present invention arises in connection with the use of a plurality of vessels or cylinders to store the gaseous hydrocarbon fuel. Specifically, a manifold means is provided for distributing the gaseous hydrocarbon fuel received from the stationary source to each of the plurality of vessels and for collecting the gaseous hydrocarbon fuel stored in one or a plurality of vessels in order to convey this fuel to the prime mover or engine. The manifold means also operates to equalize pressure, to insure that the pressure in the vessels do not exceed a predetermined pressure, filters the gaseous hydrocarbon fuel flow to the vessels, senses the pressure within the vessels, and is capable of selectively controlling the flow of fuel to and from the storage vessels. The storage vessels may also be enclosed in one or more chambers which are separated from the passenger compartment of the vehicle, and vented to the atmosphere exterior of the vehicle.

Additional objects, advantages and features of the present invention will become apparent from the following description and appended claims, taken in conjunction with the accompanying drawings.

BRIEF DESCRIPTION OF THE DRAWINGS

FIG. 3 is an exploded assembly view of one of the gaseous hydrocarbon fuel storage cylinders shown in FIG. 1.

FIG. 4 is a cross-sectional view of the cylinder shown in FIG. 2, taken along lines 3—3.

DETAILED DESCRIPTION OF THE PREFERRED EMBODIMENTS

Figure 1:
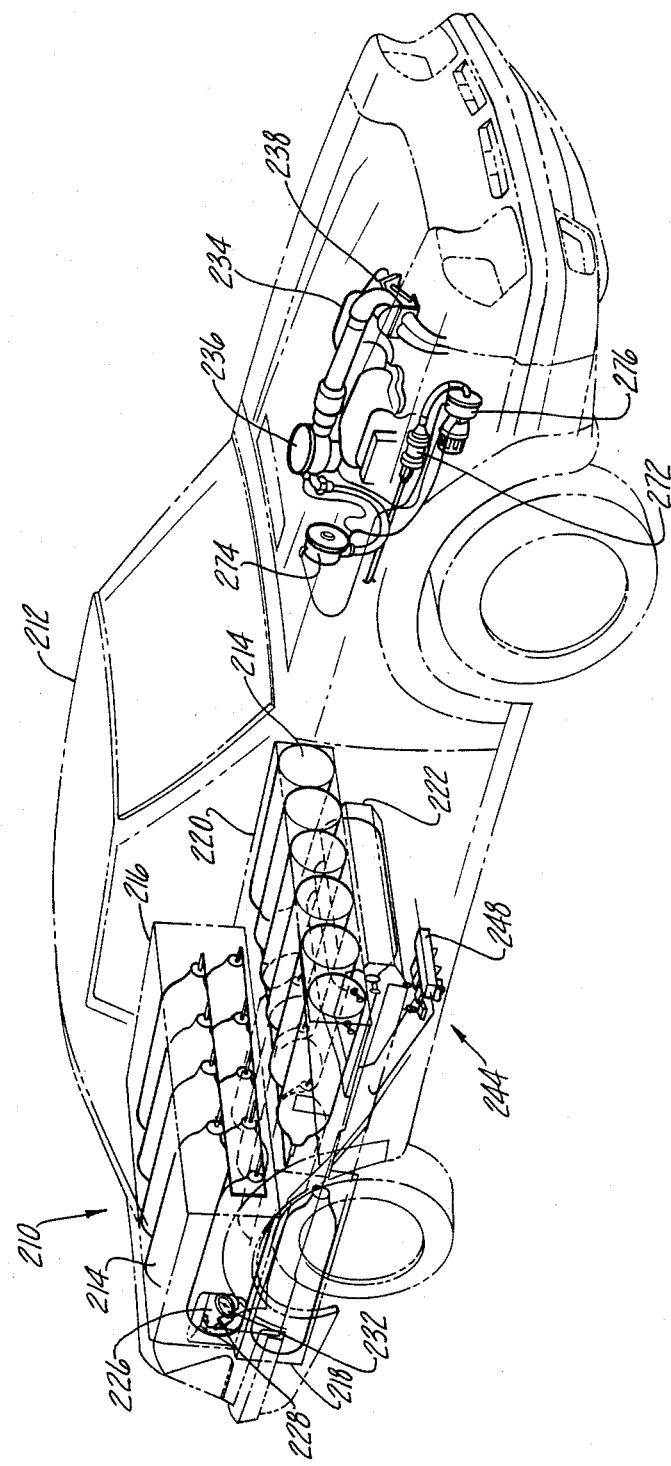
FIG. 1 is an overall perspective view of an exemplary low pressure gaseous hydrocarbon fuel storage system and power plant according to the present invention.

Referring to FIG. 1, an overall perspective view of a low-pressure gaseous hydrocarbon fuel storage system and power plant 210 according to the present invention is shown. The power plant 210 represents an actually constructed embodiment of the present invention, and FIG. 1 shows the physical locations of the various components of the power plant 210 in conjunction with a vehicle 212 (shown in phantom) which was actually utilized to demonstrate the principles of the present invention. In the actually constructed embodiment, vehicle 212 is a 1983 Ford "EXP" model automobile. However, it should be appreciated that the principles of the present invention are not limited to the embodiment shown in FIG. 1, but are equally applicable to other embodiments of gaseous hydrocarbon fuel storage systems and power plants, as will become apparent from the description below.

Figure 2:
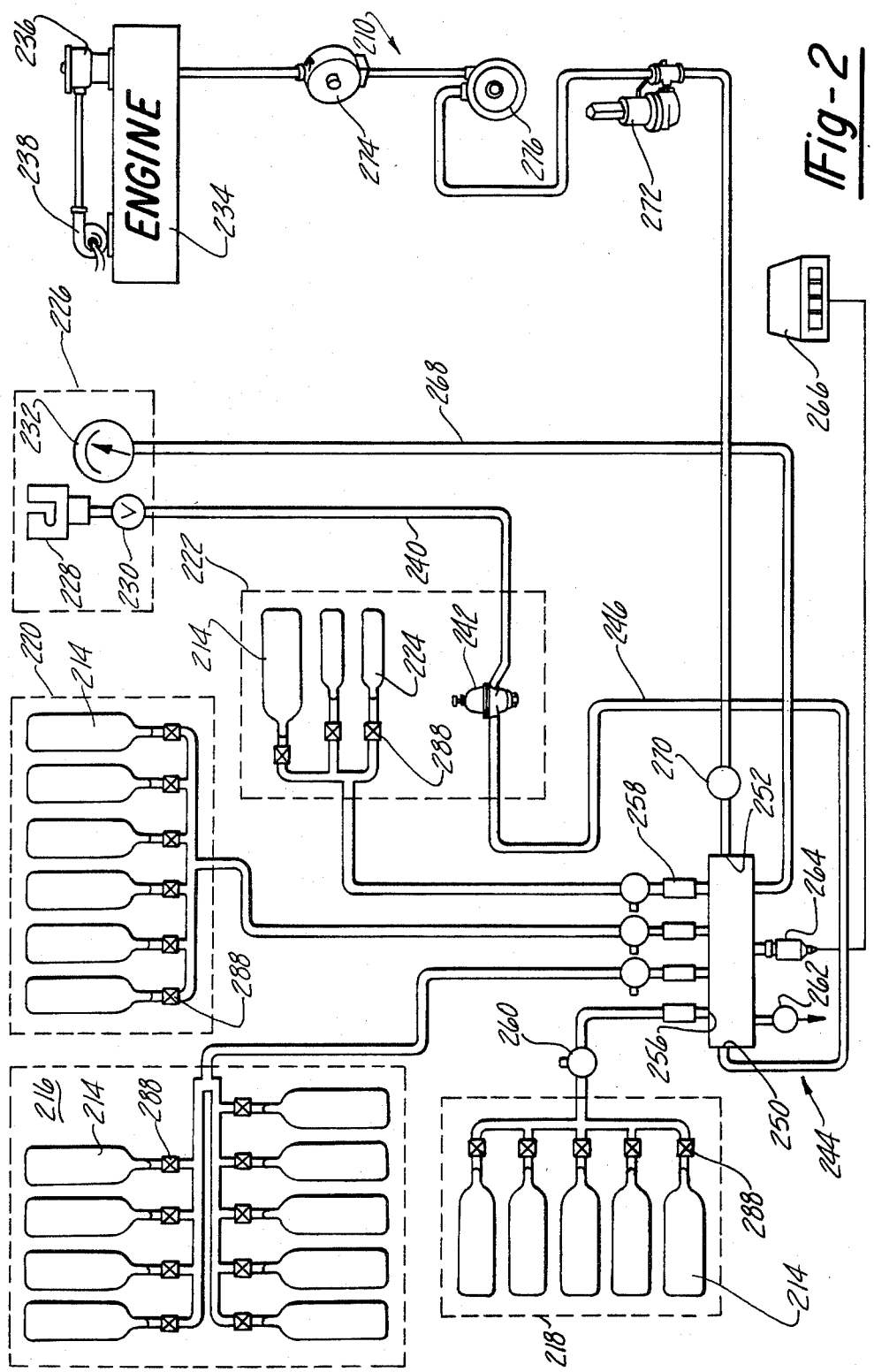
FIG. 2 is a schematic view of the low pressure gaseous hydrocarbon fuel storage system and power plant shown in FIG. 1.

Referring to FIG. 2, a schematic diagram of the power plant 210 is shown. Since some of the components of the power plant 210 may be best seen with reference to FIG. 2, both FIGS. 1 and 2 will be jointly used to describe the overall structure and operation of the power plant. The power plant 210 includes four distinct sets of cylinders 214 which are used to store a self-contained supply of the gaseous hydrocarbon fuel for the vehicle 212. While it is preferred that natural gas be used for the gaseous hydrocarbon fuel, other gaseous hydrocarbon fuels may also be utilized, such as propane, methane, and butane. Each of the sets of cylinders 214 are mounted in chambers which are enclosed and separated from the passenger compartment of the vehicle 212. Thus, the power plant 210 provides for a chamber 216 which houses nine cylinders, a chamber 218 which houses five cylinders, a chamber 220 which houses six cylinders, and a chamber 222 which houses three cylinders. These chambers are shown in phantom in FIG. 2. It should also be noted that the chamber 222 includes two cylinders 224 which are smaller than the cylinders 214 which are used throughout the rest of the storage system.

Accordingly, the storage system portion of the power plant 210 includes a total of twenty-three cylinders to store the natural gas or other gaseous hydrocarbon fuel. These twenty-three storage cylinders provide for a total gas storage capability of approximately 8.1 cubic feet (0.23 cubic meters). In the particular embodiment shown in FIGS. 1 and 2, the cylinders 214 and 224 are conventional fire-extinguisher type cylinders. The particular number and configuration of the cylinders 214 and 224 were chosen to conform to the space available in the vehicle 212, and thereby avoid any significant modifications to the structure of the vehicle 212 other than the removal of the gasolene tank which was originally equipped to the vehicle 212.

It should be appreciated that the principles of the present invention are not in any way limited to the particular number and configuration of cylinders shown in FIGS. 1 and 2. Indeed, the twenty-three cylinders may be replaced by a single storage vessel in the appropriate application. Accordingly, it should be understood that a variety of suitable storage vessel types, shapes and sizes may be employed in accordance with the present invention. The only essential requirement of such storage vessels is that they are capable of being pressurized to the maximum pressure limits at which the storage system operates.

The power plant 210 also includes a fuel port 226 which is located on the vehicle in the place normally used to supply gasolene to the vehicle. The fuel port 226 comprises a quick connector assembly 228, a check valve 230, and a pressure gauge 232. The quick connector assembly 228 is used to provide a fluid communication link to a stationary source of a gaseous hydrocarbon fuel from which the cylinders 214 and 224 may be charged or filled with this fuel.

One such stationary source of a gaseous hydrocarbon fuel is described in a copending application assigned to the assignee of the present invention, entitled "Gaseous Fuel Refueling Apparatus", filed of even date with the present application. This copending application discloses a stationary apparatus for supplying fuel to gaseous fuel consuming devices, such as the vehicle 212. This refueling apparatus is adapted to compress or pressurize the gaseous fuel to a range of approximately 100 psig (689 kPa) to approximately 400 psig (2760 kPa). Accordingly, this refueling apparatus represents a low-pressure stationary source of the gaseous hydrocarbon fuel. Such a re-fueling apparatus and the exemplary vehicle herein are also disclosed in a copending application, entitled "GASEOUS HYDROCARBON FUEL STORAGE SYSTEM AND POWER PLANT FOR VEHICLES AND ASSOCIATED REFUELING APPARATUS", filed of even date with the present application and assigned to the same assignee of the present invention. Both of these patent applications are hereby incorporated by reference.

One of the advantages of the present invention is that the storage system may be charged from either a low-pressure stationary source of the fuel or a high-pressure source of the fuel. In the particular embodiment illustrated in FIGS. 1 and 2, gaseous hydrocarbon fuel may be provided to the storage system at pressures up to 3000 psi (20.7 MPA). Such a high pressure stationary source of gaseous hydrocarbon fuel may be provided for example by a fill station used in fleet operations.

The check valve 230 is used to permit flow of the gaseous hydrocarbon fuel from the stationary source of the fuel to the storage cylinders 214 and 224 through the quick connector assembly 228, and also to prevent the flow of the gaseous hydrocarbon fuel from the storage cylinders out through the connector assembly. As with the quick connector assembly 228, the check valve 230 may be comprised of any conventional and commercially available device suitable for the operation described above. For example, the check valve 230 in one embodiment according to the present invention comprises a model B-8CPA2-350 check valve available from the Nupro Company, Willoughby, Ohio.

The pressure gauge 232 is used to provide a visual indication of the pressure in the storage cylinders 214 and 224. As will be appreciated by those skilled in the art, the pressure gauge 232 will be particularly useful when the storage system is being charged with the gaseous hydrocarbon fuel, as the pressure reading will be indicative of the amount of gas stored.

The above described fuel port 226 forms part of the conveying means according to the present invention which is used to convey the gaseous hydrocarbon fuel to the storage cylinders 214 and 224 from the stationary source of the fuel and for conveying the fuel stored in these cylinders to the prime mover of the vehicle 212. In the embodiment shown in FIGS. 1 and 2, this prime mover is generally comprised of an internal combustion engine 234. However, it should be appreciated that the principles of the present invention are not limited to any particular type of prime mover, providing that the prime mover has means for combining the gaseous hydrocarbon fuel with air to produce the mechanical energy therefrom necessary to move the vehicle 212. In the embodiment shown in FIGS. 1 and 2, this combining means is comprised of a carburetor 236 and a turbo charger 238. The carburetor 236 is specifically designed to be operable with gaseous hydrocarbon fuels such as natural gas. In one form of the present invention, the carburetor 236 is a model CA100-8 carburetor which is available from Impco Carburetion, Inc., Cerritos, Calif. Additionally, in this actually constructed embodiment of the present invention, the turbo charger 238 is a model RHB5 turbo charger available from Warner-Ishi, Decatur, Ill. As will be appreciated by those skilled in the art, the turbo charger 238 is used to increase the pressure of the intake air to the engine, and therefore provide for additional horsepower.

Since the power plant 210 is intended to operate solely upon a gaseous hydrocarbon fuel rather than gasoline, certain advantageous modifications to the engine 234 were made in the actually constructed embodiment of FIG. 1. These modifications were designed to optimize the performance of the engine 234 in conjunction with the use of natural gas as the fuel for the engine 234. Firstly, the compression ratio to this standard equipment engine for the vehicle 212 was increased from 8:1 to 13.6:1 in order to take advantage of the relatively high octane rating of natural gas. As will be appreciated by those skilled in the art, each increment in the compression ratio generally provides for a 3% improvement in thermodynamic efficiency for each incremental increase in compression ratio. This increase in the compression ratio was achieved by installing longer pistons in the engine and appropriately milling the engine head to decrease the available volume in the engine cylinders. It should also be noted that the engine timing was appropriately advanced to account for the difference in the flame speed of gasoline and natural gas. It should be further noted that the conversion of the vehicle 212 to a natural gas powered vehicle permitted the catalytic converter and the other standard pollution control equipment to be removed from the vehicle. The elimination of this equipment was in recognition of the fact that natural gas is a much more cleaner burning fuel than gasoline, (i.e fewer objectional emissions).

Turning again to the means for conveying the gaseous hydrocarbon fuel to the storage cylinders 214 and 224 and from these cylinders to the carburetor 236 of the engine 234, a high pressure conduit 240 is provided to receive the gaseous hydrocarbon fuel supplied at the fuel port 226. The high pressure conduit 240 is preferably made from stainless steel and capable of withstanding pressures up to 3000 psi (20.7 MPa). A high pressure regulator 242 is mounted in the chamber 222 and connected to the high pressure conduit 240 for defining the maximum pressure at which the gaseous hydrocarbon fuel is stored in the cylinders 214 and 224. Specifically, the high pressure regulator 242 operates to reduce pressures from as high as 3000 psi (20.7 MPa) to a maximum pressure of 300 psig (2070 kPa). Accordingly, the maximum pressure at which gaseous hydrocarbon fuel can be stored in the cylinders 214 and 224 is approximately 300 psig (2070 kPa).

In the actually constructed embodiment of the present invention shown in FIGS. 1 and 2, the high pressure regulator 242 is comprised of a model 1301G high pressure regulator available from Fisher Controls Company, Marshall Town, Iowa. However, as with all of the various components to the power plant 210, the principles of the present invention are not limited to the particular high pressure regulator utilized in the actually constructed embodiment of FIGS. 1 and 2. Thus, it should be appreciated that other pressure regulating devices may be employed to provide suitable maximum pressure limits in the appropriate applications. For example, while it is preferred that the maximum pressure at which gaseous hydrocarbon fuel is stored to be within the range of approximately 100 psig (689 kPa) to approximately 400 psig (2760 kPa), higher or lower maximum pressure limits may also be employed. However, it should be understood that one of the principle advantages of the present invention is that the power plant 210 is capable of storing reasonable amounts of the gaseous hydrocarbon fuel at relatively low pressures, i.e. pressures below approximately 500 psig (3450 kPa). Indeed, with a 300 psig (2070 kPa) pressure limit the range of the actually constructed embodiment according to the present invention has been shown to be approximately 100–110 miles (161–177 km) in tests where the vehicle 210 was travelling at a constant velocity of 45 miles per hour (72 km per hour).

One of the important components of the conveying means is a manifold assembly 244 which is used to distribute the gaseous hydrocarbon fuel received from the stationary source to each of the cylinders 214 and 224. The manifold assembly 224 is also used to collect the gaseous hydrocarbon fuel stored in the cylinders 214 and 224 in order to convey this fuel to the carburetor 236 of the engine 234. The manifold assembly 244 is connected to the high pressure regulator 242 via a low pressure conduit 246. It should be noted that as a result of the low pressure operation it is preferred that the conduit 246 as well as the other remaining conduits in the power plant 210 be made from copper. However, of course, other suitable materials may also be employed to construct these conduits, such as coated aluminum and braided steel hose.

Figure 5:
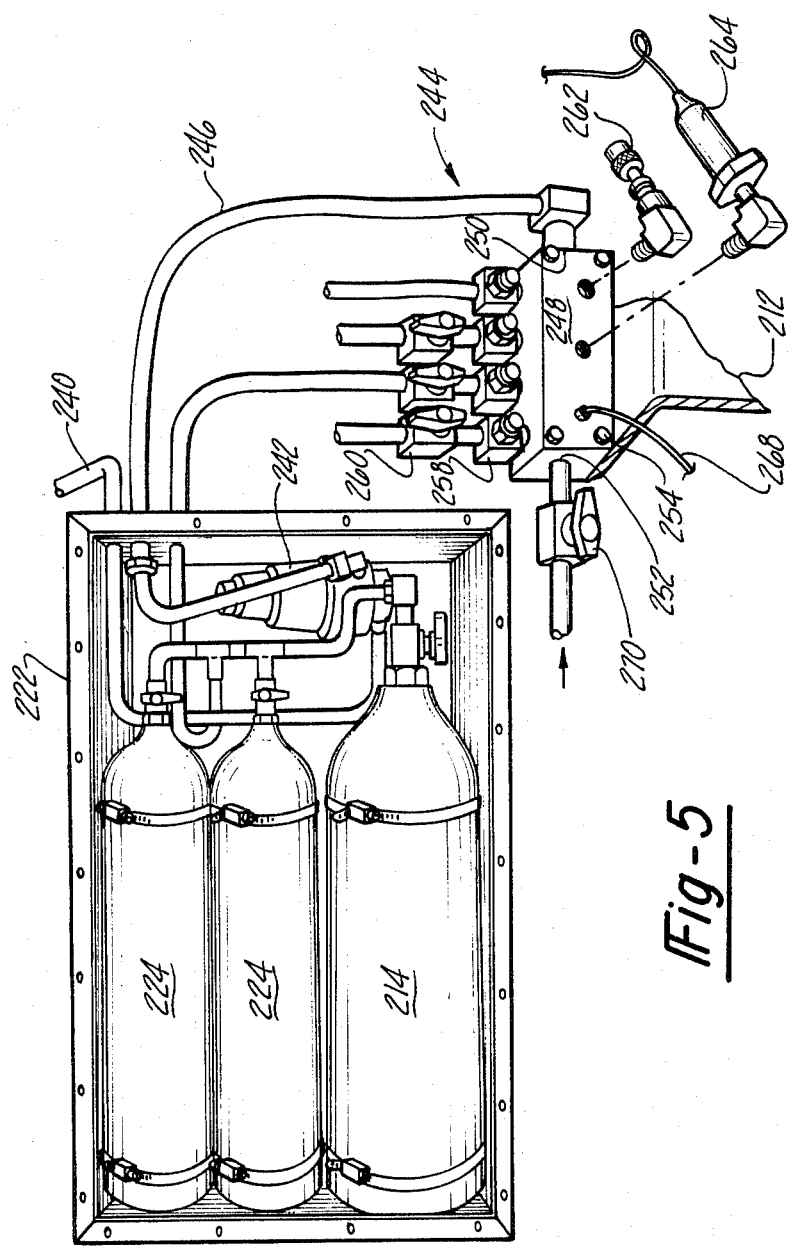
FIG. 5 is a perspective view of a portion of the low pressure gaseous hydrocarbon fuel storage system and power plant shown in FIG. 1, particularly illustrating the manifold means according to the present invention.

The manifold assembly 244 includes a manifold block 248, which may best be seen with reference to FIG. 5. The manifold block 248 is preferably made out of aluminum, and includes an inlet port 250 for receiving the gaseous hydrocarbon fuel from the stationary source and an outlet port 252 for conveying the gaseous hydrocarbon fuel stored in the cylinders 214 and 224 to the carburetor 236 of the engine 234. A plurality of bolts 254 are provided to mount the manifold block 248 to the vehicle 212. The manifold block 248 also includes a bi-directional port for conveying the gaseous hydrocarbon fuel to and from each of the chambers 216–222. Thus, for example, the manifold block 248 includes a bi-directional port 256 for conveying the gaseous hydrocarbon fuel to and from the cylinders 214 contained in the chamber 218.

The manifold assembly 244 also includes a filter element 258 connected to each of the bi-directional ports of the manifold blocks 248 for filtering the flow of the gaseous hydrocarbon fuel to each of the chambers 216–222. In the actually constructed embodiment of FIG. 1, these filter elements 258 each comprise a TF series Nupro filter. However, it should be appreciated that any other filter means known in the art that is suitable for substantially preventing the introduction of particles or other impurities into the cylinders 214 and 224 may be utilized. Thus, for example, fiberous-type filters, screen-mesh filters, and filters of sintered construction may be suitably employed.

Also interposed between the manifold block 248 and the chambers 218–222 is a three-way valve 260. These three-way valves 260 are used for individually controlling the flow of the gaseous hydrocarbon fuel to and from each of the chambers 216–222. Thus, for example, the three-way valve 260 interposed between the chamber 218 and the manifold block 248 may be manually closed to prevent the flow of any gaseous hydrocarbon fuel to or from the cylinders 214 contained in this chamber. In the actually constructed embodiment of FIG. 1, these three-way valves 260 are also used to permit gas samples to be obtained from each of the chambers 216–222.

The manifold assembly 244 also includes a pressure relief valve 262 which is used to insure that the pressure in the storage cylinders 214 and 224 does not exceed a predetermined pressure limit. Preferably, this predetermined pressure limit should exceed the maximum pressure range of the storage system by a predetermined amount, such as 25 psig (172 kPa) to 150 psig (1034 kPa). In the actually constructed embodiment of FIG. 1, the pressure relief valve 262 is adapted to open at 425 psig (2930 kPa).

The manifold assembly 244 also includes a transducer 264 for sensing the pressure within the cylinders 214 and 224. The transducer 264 may be any suitable pressure transducer such as a Kulite type IPTE-1000 pressure transducer. The pressure transducer 264 generates an electrical signal output to a digital display 266 located in the passenger compartment of the vehicle 212, which is used to provide a visual indication of the pressure sensed by the transducer. Accordingly, it will be appreciated that the digital display 266 serves as a fuel gauge for the operator of the vehicle 212. It should also be noted that the pressure gauge 232, described above, is also connected to the manifold block 248 via a conduit 268.

Finally, the manifold assembly 244 also includes a manual valve 270 for controlling the flow of the gaseous hydrocarbon fuel from the outlet port 252 of the manifold block 248 to the carburetor 236 of the engine 234. Thus, the valve 270 provides a means for manually turning off all flow of the gaseous hydrocarbon fuel from the cylinders 214 and 224 to the engine 234, such as for maintenance of the power plant 210 and the like. In the actually constructed embodiment of FIG. 1, the valve 270 is comprised of a Nupro B8P6T series valve.

The power plant 210 also includes means for controlling the flow of the gaseous hydrocarbon fuel from the storage system to the carburetor 236 of the engine 234. This controlling means is generally comprised of a pair of regulators 272–274, and switch 276. The regulators 272 and 274 are used to reduce the pressure of the gaseous hydrocarbon fuel conveyed to the carburetor 236. In the actually constructed embodiment of FIG. 1, the regulator 272 is comprised of a Fisher 620 series regulator which reduces the pressure from 300 psig (2070 kPa) to 100 psig (689 kPa), and the regulator 274 is comprised of an Impco model PEV regulator which reduces the pressure from 100 psig (689 kPa) to approximately atmospheric pressure. The switch 276 is used for selectively permitting flow of the gaseous hydrocarbon fuel from the storage system to the carburetor 234, and is adapted to be responsive to the closing of the ignition switch or the energization of the engine 234. In the actually constructed embodiment of FIG. 1, the switch 276 is comprised of an Impco series VFF-30 fuel lock filter. Again, with regard to the switch 276, as well as to all the other components of the power plant 210, the principles of the present invention are not limited to the specific actually constructed embodiment of FIG. 1, and it should be understood that other suitable components may be employed equally as well.

Referring to FIGS. 3 and 4, the specific construction of the storage cylinders 214 and 224 will now be described. Each of the storage cylinders includes an inlet/outlet port 278 for conveying the gaseous hydrocarbon fuel to and from the cylinders. Importantly, each of the storage cylinders 214 and 224 contain a predetermined sorbent material 280 for reducing the pressure at which the gaseous hydrocarbon fuel is stored within the cylinders. As referred to herein, the terms "sorbent" or "sorptive" are intended to refer to "adsorbents", "absorbents" or both. The absorbent material may comprise any of a number of adsorbents or molecular sieves, such as activated carbon, zeolite compounds, various clays, or silica gels, for example. Such adsorbent materials may be in the form of pellets, spheres, granulated particles, or other suitable forms whereby the surface area of the adsorbent material is optimized in order to maximize the amount of gaseous fuel adsorbed on the surface thereof. The present invention also contemplates the use of liquid absorbents, such as a liquid coating on an adsorbent material.

Although Columbia grade 9LXC activated carbon pellets were used as the sorbent material 280 in the actually-constructed embodiment of FIG. 1, and is generally regarded to the preferred sorbent material, other sorbent materials may be alternatively employed. Specific examples of such sorbent materials are listed below:

| ADSORBENT MATERIAL | MANUFACTURER | PRODUCT DESIGNATION |
|---|---|---|
| Activated Carbon | Calgon Corp. | BPL 4 × 10 Mesh Coal Base |
| Activated Carbon | Calgon Corp. | PCB 4 × 10 Mesh Coconut Base |
| Activated Carbon | American Norit Company, Inc. | Sorbonorit B4 Pellets |
| Activated Carbon | Westvaco Chemical Company | Nuchar S-A |
| Activated Carbon | Westvaco Chemical Company | Nuchar WV-A 14 × 35 Wood Base Granular |
| Activated Carbon | Witco Chemical Division | Columbia Grade 9LXC Powder Low Ash Coal Base |
| Activated Carbon | Witco Chemical Division | Columbia Grade 9LXC Pellet Low Ash Coal Base |
| Activated Carbon | American Norit Company | Norit RB-3 |
| Zeolite (Natural) | Anaconda Minerals Company | 2020A/D1 |
| Zeolite (Synthetic) | Union Carbide Corp. Linde Division | Metal Alumino Silicate 13X 8 × 12 Beads |
| Zeolite (Synthetic) | Union Carbide Corp. Linde Division | Metal Alumino Silicate 4A 8 × 12 Beads |
| Zeolite (Synthetic) | Union Carbide Corp. Linde Division | Metal Alumino Silicate 5A ⅛" Pellets |
| Zeolite (Synthetic) | Union Carbide Corp. Linde Division | Metal Alumino Silicate 13X Powder |
| Zeolite (Natural) | Anaconda Minerals Company | 5050L |
| Zeolite (Natural) | Double Eagle Petroleum and Mining Company | Clinoptilolite |

It should be noted that it has been found advantageous to activate the sorbent material 280 before putting the storage system of the power plant 210 in use. Specifically, the sorbent material is first packed into the cylinders 214 and 224 to the maximum extent possible, then each of the cylinders are evacuated to a negative pressure. Then each of the cylinders is placed in an oven or otherwise heated and then evacuated again.

Each of the cylinders 214 and 224 include two filters 282 and 284 which are used to substantially prevent the introduction of particles or other impurities into the sorbent material 280, as well as to insure that the sorbent material 280 is retained within the cylinders 214 and 224. In the actually constructed embodiment of FIG. 1, the filter 282 is a gas permeable, fiberous polyester disc, and the filter 284 is a stainless steel mesh strainer element obtained from a Nupro TF series filter. Each of these mesh strainer elements were secured to a steel cap 282 of the cylinders via a press fit relationship. Additionally, it should be noted that each of the cylinders 214 and 224 is also provided with a valve 288 for selectively permitting flow of the gaseous hydrocarbon fuel to and from each of these cylinders and to maintain a vacuum while activating the sorbent material.

Figure 6:
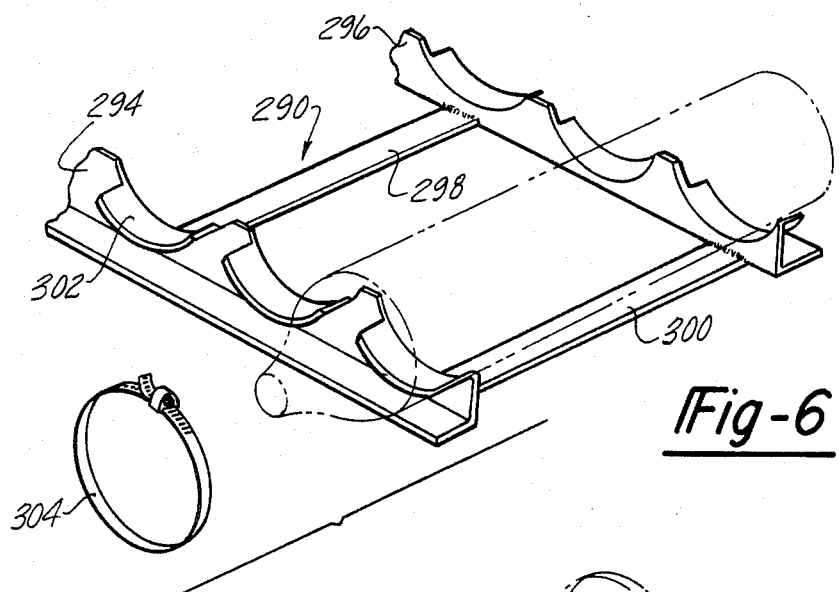
FIG. 6 is a perspective view of a first cradle used to mount the stored cylinders in the vehicle.
Figure 7:
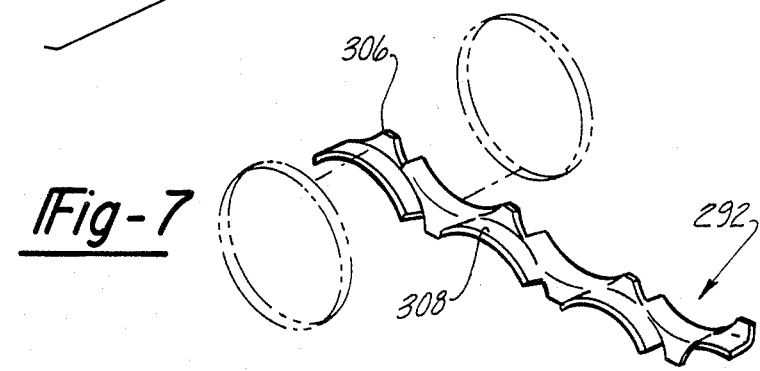
FIG. 7 is a perspective view of a second cradle used to mount the stored cylinders in the vehicle.
Figure 8:
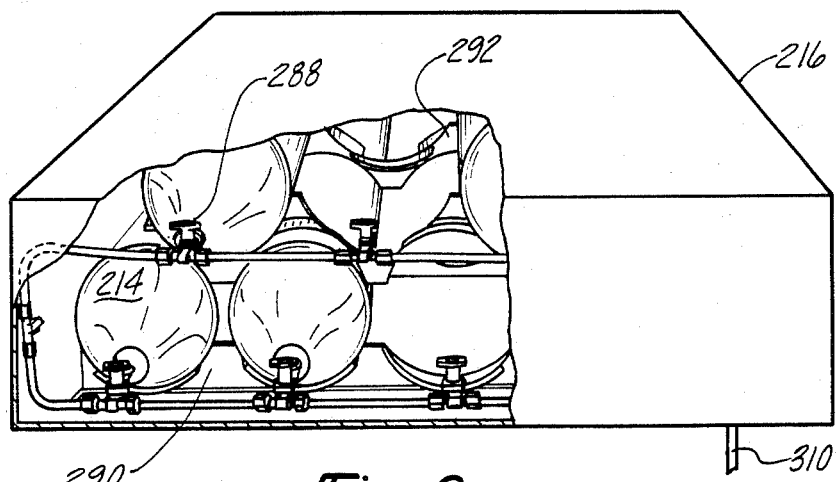
FIG. 8 is a perspective cut-away view of a a double row chamber in accordance with the present invention.

Referring now to FIGS. 6, 7 and 8, the general construction of the chambers 216–222 and the structure for mounting the cylinders 214 and 224 in these chambers will now be described. FIG. 6 illustrates a first cradle 290 which is used in all of the chambers 218–222 for securing the cylinders to the chambers. FIG. 7 illustrates a second cradle 292 which is used to secure the upper row of cylinders to the lower row of cylinders in the chamber 216, as illustrated in FIG. 8.

The cradle 290 is generally comprised of two rack members 294 and 296 which are aligned generally in parallel and connected by a pair of bracket members 298 and 300. Each of the rack members 294 and 296 are formed with a plurality of arcuate flange portions 302 which conform to the shape of the cylinders and are adapted to nestingly receive the cylinders. A conventional clamping ring 304 is then used to secure each end of the cylinders to the respective rack members 294 and 296 by tightening the clamping rings 304 around the cylinders and the flange portions 302.

The cradle 292 comprises a pair of independent rack members 306 which are shaped such that they may be interposed between the upper and lower rows of cylinders in the chamber 216. Each of the rack members 306 includes a plurality of alternately facing arcuate flange portions 308. The flange portions 308 on one side of the rack member 306 are used to mount the rack member to the lower row of cylinders in the chamber 216 via conventional clamping rings, while the flange portions 308 on the other side of the rack member are used to secure the upper row of cylinders to the lower row of cylinders in this chamber.

Referring to FIG. 8, a perspective cut-away view of the completely assembled chamber 216 is shown. Firstly, it should be noted that the cradle 290 may be secured to the chamber 216 by any conventional means known to those skilled in the art. Additionally, the chamber 216 may be constructed out of any suitable material for housing the cylinders 214. In the actually constructed embodiment of FIG. 1, the chamber 216 was generally constructed of aluminum. To provide for a generally gas tight seal, a gasket was interposed between the top portion and the sidewalls of the chamber 216. In order to facilitate the removal of any condensation which may occur on the cylinders 214 during the operation of the vehicle 212, the chamber 216 is provided with a vent tube 310 which is adapted to permit the chamber to be vented to the atmosphere exterior of the vehicle. A similar vent tube is also provided on each of the other chambers 218–222.

Figure 9:
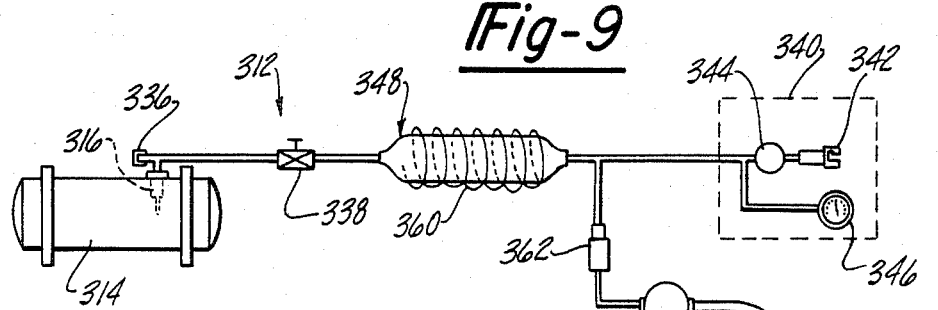
FIG. 9 is a schematic view of a second low pressure gaseous hydrocarbon fuel storage system and power plant in accordance with the present invention.

Referring generally to FIGS. 9–13, a second embodiment of a gaseous hydrocarbon fuel storage system and power plant 312 is shown. FIG. 9 illustrates a schematic view of this power plant. One of the significant differences between the power plant 312 and the power plant 210 is that the power plant 312 provides for only a single storage vessel 314, which may be, for example, a conventional propane tank. While it may be advantageous in many applications to have only one or two storage vessels, it should also be noted that one advantage to having a number of storage vessels in that the heat transfer characteristics of the storage system will generally be better when a number of storage vessels are employed. Since heat is generated during the sorption process, this heat will, in general, be more readily liberated from a number of smaller vesses in comparason to a single larger vessel. However, if desired, suitable heat exchange means may, of course, be added to the construction of a single vessel, such as the storage vessel 314.

As in the case of the cylinders 214 and 224, the storage vessel 314 is filled with a suitable sorbent material 315 for reducing the pressure at which the gaseous hydrocarbon fuel is stored. The storage vessel 314 is also provided with a filter assembly 316 which may best be seen with reference to FIG. 10. The filter assembly 316 includes an aluminum block 318 which is secured to the storage vessel 314 via a plurality of bolts 320. A conventional 80 micron filter 322 is secured to the block 318 via a bolt 324. The block 318 is also formed with eight circumferentially spaced passageways 326 which provide a fluid communication link between the filter 322 and the conduit means used to convey the gaseous hydrocarbon fuel to and from the storage vessel 314. These passageways 326 may best be seen with reference to FIG. 11 which is a cross-sectional view of the filter assembly 316 taken along lines 11—11 of FIG. 10.

Figure 12:
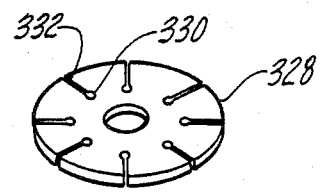
FIG. 12 is a perspective view of one of the filter discs shown in FIG. 10.

The filter 322 is comprised of a plurality of adjacently disposed copper plates or discs 328. A perspective view of one of these copper plates 228 is shown in FIG. 12. Each of these copper plates 328 includes a total of eight circumferentially spaced openings 330 and a slot 332 extending radially outwardly from these openings to provide an outlet for the filter having a magnitude of 80 microns. As will be appreciated by those skilled in the art, each of the copper plates 328 are aligned such that the openings 330 form vertical passageways along the length of the filter 322. The filter assembly 316 also includes a gas permeable, fiberous filter which is preferably, although not necessarily, made from a suitable polyester material. This fiberous filter element 334 is interposed between the filter 322 and the sorbent material 315.

Figure 10:
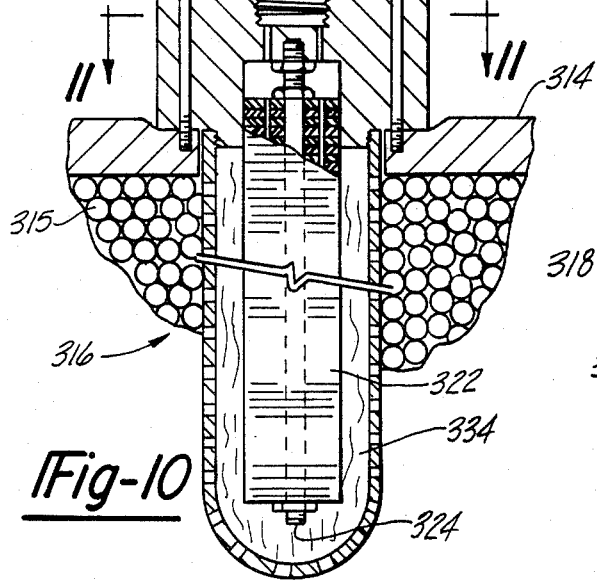
FIG. 10 is a cross-sectional view of a portion of the storage system shown in FIG. 9, particularly illustrating the in-line filter to the storage tanks.
Figure 11:
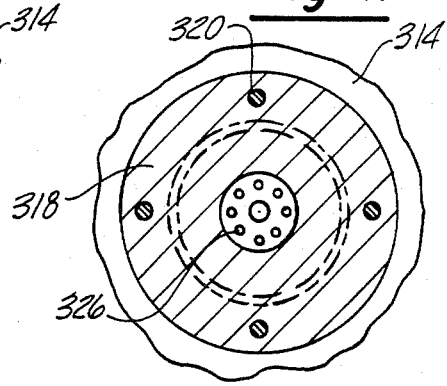
FIG. 11 is a cross-sectional view of the filter assembly shown in FIG. 10 taken along lines 11—11.

As may be seen in both FIGS. 9 and 10, the storage vessel 314 is also provided with a relief valve 336 and a manual shut-off valve 338. The relief valve 336 operates to insure that the pressure in the storage vessel 314 does not exceed the maximum pressure at which the power plant 312 is intended to operate.

Figure 13:
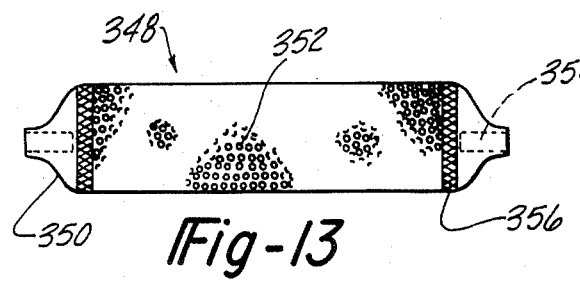
FIG. 13 is a cross-sectional view of the adsorptive filter shown in FIG. 9.

The power plant 312 also includes a fuel port 340 which generally comprises a quick connector assembly 342, a check valve 344 and a pressure gauge 346. Interposed between the fuel port 340 and the storage vessel 314 is an sorptive filter 348 which forms an important part of the present invention. A cross-sectional view of the sorptive filter is shown in FIG. 13. The sorptive filter 348 is comprised of a vessel 350 which contains a predetermined sorbent material 352 for filtering the flow of the gaseous hydrocarbon fuel to the storage vessel 314. The vessel 350 may be any shape or construction which is capable of withstanding the maximum pressure at which the power plant 312 is intended to operate. However, it is generally preferred that the size of filter vessel 350 be related to the size of the storage vessel 314. Specifically, it has been found advantageous to provide at least 0.0052 cubic feet (0.147 cubic millimeters) of filter capacity to each cubic feet (0.028 cubic meters) of storage capacity. With regard to the sorbent material 352, it is preferred that this sorbent material be comprised of activated carbon. In this regard, both the sorbent material 352 contained in the sorptive filter 348 and the sorbent material 315 contained in the storage vessel 314 may both be comprised of activated carbon.

The sorptive filter 348 is provided with a filter element 354 and a gas permeable, fiberous filter element 356 at each end thereof. These two filter elements may be similar in construction to either those corresponding filter elements shown in FIG. 3 or 10, or other suitable filter construction.

It should be noted that the sorptive filter 348 is associated with the conveying means of the power plant 312 such that the gaseous hydrocarbon fuel supplied by a stationary source thereof must first pass through the sorptive filter before being stored in the storage vessel 314. Likewise, before the stored gaseous hydrocarbon fuel can be conveyed to a carburetor 358 of the power plant 312, this fuel must again pass through the sorptive filter 348. During the charging of the stored vessel 314, the sorptive filter 348 adsorptively and/or absorptively removes predetermined constituents of the gaseous hydrocarbon fuel, as well as any odorent previously introduced to the fuel, before the gaseous hydrocarbon fuel is conveyed to the stored cylinder 314. These predetermined constituents include, for example, oil, water vapor, and so-called "heavy end" constituents of the fuel. Generally speaking, such heavy end constituents include propane and other constituents that are heavier than methane. The purpose of removing such heavy end constituents is to maximize the capability of the storage vessel 314 to sorptively store the lighter hydrocarbons, such as methane for example. It is also important to note that the sorptive filter 348 also operates to prevent the accummulation over time of any unwanted fuel constituents in the storage vessel 314.

When the engine for the power plant 312 is energized and enabled to consume the gaseous hydrocarbon fuel stored in the storage vessel 314, the sorptive filter 348 operates to desorptively re-introduce the removed constituents and odorent to the flow of the gaseous hydrocarbon fuel from the stored cylinder 314 to the carburetor 358 of the engine. Accordingly, it should be appreciated that the sorptive filter 348 is self-cleaning during each charge and discharge cycle of the storage system.

In order to assist the desorption of the undesirable constituents from the sorbent material 352 contained in the filter 348, means for increasing the temperature of the sorptive filter 348 may also be provided in the appropriate application. Preferably, this temperature increasing means is associated with the engine of the power plant 312 so that the heat generated by the operation of the engine is utilized by the temperature increasing means. One form of a suitable temperature increasing means is shown in FIG. 9 to be a conduit 360 which is wrapped around the sorptive filter 348. This conduit could be connected, for example, to either the engine cooling system or to the engine exhaust system in order to utilize at least a portion of the waste heat generated by the engine. Additionally, it may be advantageous in some applications to simply locate the sorptive filter in relatively close proximity to the engine in order to utilize the heat radiated by the engine.

Another significant difference between the power plant 210 of FIG. 1 and the power plant 312 of FIG. 9, is that the power plant 312 is adapted to operate as a dual fuel system. This dual fuel operation is controlled by a pair of solenoid valves 362 and 364. The solenoid valve 362 is used to control the flow of the gaseous hydrocarbon fuel from the storage vessel 314 to an air/fuel mixer 366 operatively associated with the carburetor 358. Whereas, the solenoid valve 364 is used to control the flow of gasolene from a suitable gaseoline tank (not shown) to the carburetor 358 of the engine. It should also be noted that a two-stage regulator 368 is interposed between the solenoid valve 362 and the air/fuel mixer 366. This regulator 368 is used to reduce the pressure of the gaseous hydrocarbon fuel from approximately 300 psig (2070 kPa) to approximately atmospheric pressure. The solenoid valves 362 and 364 may be operable in response to one or more switches contained in the passenger compartment of the vehicle which are used to determine which source of fuel supply will be provided to the engine. Accordingly, it should be appreciated that if the vehicle operator desires gasoline to be supplied to the engine, the solenoid valve 364 must be opened and the solenoid valve 362 must be closed. Similarly, if the vehicle operator desires that the gaseous hydrocarbon fuel be supplied to the engine, the solenoid valve 362 must be opened and the solenoid valve 364 must be closed.

It should also be noted that in such a dual fuel power plant, it will be difficult to provide an engine whose performance is optimized for both types of fuel. However, there are commercially available devices which are capable of automatically adjusting the timing of the engine in response to a switch between the type of fuel being supplied to the engine.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. A low-pressure gaseous hydrocarbon fuel powered vehicle comprising:
   means for storing a self-contained supply of a gaseous hydrocarbon fuel, said storing means containing a predetermined sorbent material for reducing the pressure at which a given amount of said gaseous hydrocarbon fuel is stored, said gaseous hydrocarbon fuel being stored at a maximum pressure less than approximately 500 psig (3450 kPa);
   a prime mover having means for combining said gaseous hydrocarbon fuel with air to produce the mechanical energy therefrom necessary to move said vehicle;
   means for conveying said gaseous hydrocarbon fuel to said storing means from a stationary source of said gaseous hydrocarbon fuel and for conveying said gaseous hydrocarbon fuel from said storing means to said combining means of said prime mover;
   sorbent filter means associated with said conveying means for sorptively removing at least a portion of predetermined constituents from the flow of said gaseous hydrocarbon fuel to said storing means and for desorptively re-introducing at least a portion of said predetermined constituents to the flow of said gaseous hydrocarbon fuel from said storing means to said combining means of said prime mover; and
   means associated with said conveying means for controlling the flow of said gaseous hydrocarbon fuel from said storing means to said combining means of said prime mover.

2. The gaseous hydrocarbon fuel powered vehicle according to claim 1, wherein the maximum pressure at which said gaseous hydrocarbon fuel is stored in said storing means is in the range of approximately 100 psig (689 kPa) to approximately 400 psig (2760 kPa).

3. The gaseous hydrocarbon fuel powered vehicle according to claim 2, wherein said storing means includes a plurality of vessels capable of being pressurized.

4. The gaseous hydrocarbon fuel powered vehicle according to claim 3, wherein said storing means also includes filter associated with each of said vessels, and a valve associated with each of said vessels for selectively permitting flow of said gaseous hydrocarbon fuel to and from said vessels.

5. The gaseous hydrocarbon fuel powered vehicle according to claim 4, wherein each of said vessels is a light weight cylinder and each of said filters are internally secured to the caps of said cylinders.

6. The gaseous hydrocarbon fuel powered vehicle according to claim 5, wherein said storing means further includes a gas permeable element interposed between each of said filters and said sorbent material.

7. The gaseous hydrocarbon fuel powered vehicle according to claim 6, wherein each of said gas permeable elements is a fibrous polyester element.

8. The gaseous hydrocarbon fuel powered vehicle according to claim 4, wherein the said plurality of vessels are contained in at least one enclosed chamber.

9. The gaseous hydrocarbon fuel powered vehicle according to claim 8, wherein each of said vessels is a lightweight cylinder, and said chamber includes cradle means for securing said cylinders to said chamber.

10. The gaseous hydrocarbon fuel powered vehicle according to claim 9, wherein said cylinders are stacked in two rows in said chamber, and said cradle means includes a first set of cradles for securing a bottom row of said cylinders to said chamber and a second set of cradles for securing a top row of said cylinders to said bottom row of said cylinders.

11. The gaseous hydrocarbon fuel powered vehicle according to claim 9, wherein said plurality of cylinders includes at least two cylinders, and at least one of said cylinders is contained in a first chamber and at least one of said cylinders is contained in a second chamber.

12. The gaseous hydrocarbon fuel powered vehicle according to claim 11, wherein said plurality of cylinders includes at least four cylinders, and at least two of said cylinders are contained in said first chamber and at least two of said cylinders are contained in said second chamber.

13. The gaseous hydrocarbon fuel powered vehicle according to claim 8, wherein said chamber is vented to the atmosphere exterior of said vehicle.

14. The gaseous hydrocarbon fuel powered vehicle according to claim 2, wherein said conveying means includes manifold means for distributing said gaseous hydrocarbon fuel received from said stationary source to each of said plurality of vessels and for collecting said gaseous hydrocarbon fuel stored in each of said plurality of vessels in order to convey said gaseous hydrocarbon fuel stored in said plurality of vessels to said combining means of said prime mover.

15. The gaseous hydrocarbon fuel powered vehicle according to claim 14, wherein said plurality of vessels includes at least a first and second set of vessels, where each of said sets of vessels includes at least two vessels.

16. The gaseous hydrocarbon fuel powered vehicle according to claim 15, wherein said manifold means includes an inlet port for receiving said gaseous hydrocarbon fuel from said stationary source, a first bi-directional port for conveying said gaseous hydrocarbon fuel to and from said first set of vessels, a second bi-directional port for conveying said gaseous hydrocarbon fuel to and from said second set of vessels, and an outlet port for conveying said gaseous hydrocarbon fuel stored in said first and second sets of vessels to said combining means of said prime mover.

17. The gaseous hydrocarbon fuel powered vehicle according to claim 16, wherein manifold means further includes relief valve means for ensuring that the pressure in said vessels do not exceed a predetermined pressure.

18. The gaseous hydrocarbon fuel powered vehicle according to claim 16, wherein said manifold means also includes transducer means for sensing the pressure in said vessels.

19. The gaseous hydrocarbon fuel powered vehicle according to claim 16, wherein said manifold means includes first valve means for individually controlling the flow of said gaseous hydrocarbon fuel to and from said first and second sets of vessels, and second valve means for controlling the flow of said gaseous hydrocarbon fuel from said outlet port to said combining means of said prime mover.

20. The gaseous hydrocarbon fuel powered vehicle according to claim 16, wherein said manifold means includes filter element means for filtering the flow of said gaseous hydrocarbon fuel to said first and second sets of vessels.

21. The gaseous hydrocarbon fuel powered vehicle according to claim 2, wherein said conveying means includes relief valve means for ensuring that the pressure in said storing means does not exceed a predetermined pressure.

22. The gaseous hydrocarbon fuel powered vehicle according to claim 2, wherein said conveying means includes transducer means for sensing the pressure in said storing means.

23. The gaseous hydrocarbon fuel powered vehicle according to claim 22, wherein said power plant includes display means located in a passenger compartment of said vehicle for providing a visual indication of the pressure sensed by said transducer means.

24. The gaseous hydrocarbon fuel powered vehicle according to claim 2, wherein said conveying means includes fuel port means for receiving said gaseous hydrocarbon fuel from said stationary source of said gaseous hydrocarbon fuel, said fuel port means including connector means for providing a fluid link to said stationary source, and check valve means for permitting flow of said gaseous hydrocarbon fuel from said stationary source to said storing means through said connector means and preventing flow of said gaseous hydrocarbon fuel from said storing means out through said connector means.

25. The gaseous hydrocarbon fuel powered vehicle according to claim 24, wherein said fuel port means further includes means for providing a visual indication of the pressure in said storing means.

26. The gaseous hydrocarbon fuel powered vehicle according to claim 24, wherein said conveying means further includes high pressure regulator means interposed between said fuel port means and said storing means for defining the maximum pressure at which said gaseous hydrocarbon fuel is stored in said storing means.

27. The gaseous hydrocarbon fuel powered vehicle according to claim 2, wherein said sorbent material is comprised of activated carbon.

28. The gaseous hydrocarbon fuel powered vehicle according to claim 2, wherein said controlling means includes regulator means interposed between said storing means and said combining means of said prime mover for reducing the pressure of said gaseous hydrocarbon fuel conveyed to said combining means.

29. The gaseous hydrocarbon fuel powered vehicle according to claim 28, wherein said controlling means also includes means for selectively permitting flow of said gaseous hydrocarbon fuel from said storing means to said combining means of said prime mover.

30. In a vehicle, a low-pressure gaseous hydrocarbon fuel power plant, comprising:
means for storing a self-contained supply of a gaseous hydrocarbon fuel, said storing means containing a predetermined sorbent material for reducing the pressure at which a given amount of said gaseous hydrocarbon fuel is stored;
a prime mover having means for combining said gaseous hydrocarbon fuel with air to produce the mechanical energy therefrom necessary to move said vehicle;
means for conveying said gaseous hydrocarbon fuel to said storing means from a stationary source of said gaseous hydrocarbon fuel and for conveying said gaseous hydrocarbon fuel from said storing means to said combining means of said prime mover;
means associated with said conveying means for sorptively filtering the flow of said gaseous hydrocarbon fuel to said storing means; and
means associated with said conveying means for controlling said flow of said gaseous hydrocarbon fuel from said storing means to said combining means of said prime mover.

31. The gaseous hydrocarbon fuel powered vehicle according to claim 30, wherein the maximum pressure at which said gaseous hydrocarbon fuel is stored in said storing means is less than approximately 500 psig (3450 kPa).

32. The gaseous hydrocarbon fuel powered vehicle according to claim 31, wherein the maximum pressure at which said gaseous hydrocarbon fuel is stored in said storing means is in the range of approximately 100 psig (689 kPa) to approximately 400 psig (2760 kPa).

33. The gaseous hydrocarbon fuel powered vehicle according to claim 32, wherein said filtering means sorptively removes, at least in part, predetermined constituents of said gaseous hydrocarbon fuel before said gaseous hydrocarbon fuel is conveyed to said storing means.

34. The gaseous hydrocarbon fuel powered vehicle according to claim 33, wherein said filtering means is associated with said conveying means such that the flow of said gaseous hydrocarbon fuel from said storing means to said combining means of said prime mover also passes through said filtering means.

35. The gaseous hydrocarbon fuel powered vehicle according to claim 34, wherein said filtering means desorptively re-introduces, at least in part, said removed predetermined constituents to the flow of said gaseous hydrocarbon fuel from said storing means to said combining means of said prime mover.

36. The gaseous hydrocarbon fuel powered vehicle according to claim 35, wherein said power plant includes means for increasing the temperature of said filtering means when said gaseous hydrocarbon fuel is conveyed from said storing means to said combining means of said prime mover.

37. The gaseous hydrocarbon fuel powered vehicle according to claim 36, wherein said temperature increasing means is associated with said prime mover such that the heat generated by the operation of said prime mover is utilized at least in part by said temperature increasing means.

38. The gaseous hydrocarbon fuel powered vehicle according to claim 32, wherein said filtering means comprises a vessel containing a predetermined sorbent material.

39. The gaseous hydrocarbon fuel powered vehicle according to claim 38, wherein said predetermined sorbent material contained in said storing means and said predetermined sorbent material contained in said vessel of said filtering means are both comprised of activated carbon.

40. The gaseous hydrocarbon fuel powered vehicle according to claim 33, wherein said predetermined constituents include water vapor, oil, propane, butane and hydrocarbons heavier than methane.

41. A low-pressure natural gas powered vehicle comprising:
- means for storing a self-contained supply of gaseous natural gas at a maximum pressure less than approximately 500 psig (3450 kPa) said storing means including a plurality of pressure vessels, each of said vessels containing a predetermined adsorbent material in order to reduce the pressure at which a given amount of said gaseous natural gas is stored, a plurality of said pressure vessels being contained within an enclosed chamber, the interior of said chamber being vented to the exterior of said vehicle;
- each of said pressure vessels including an inlet/outlet port for allowing said gaseous natural gas to flow into and out of said vessel, a filter associated with each of said vessels for filtering said gaseous natural gas flowing into and out of said vessel, a gas permeable element interposed between each of said filters and said adsorbent material;
- an internal combustion engine having carburetion means for combining said gaseous natural gas with air to produce mechanical energy therefrom in order to move said vehicle;
- means for conveying said gaseous natural gas to said storing means from a stationary source of said gaseous natural gas and for conveying said gaseous natural gas from said storing means to said carburetion means of said engine;
- said conveying means incuding manifold means for distributing said gaseous natural gas received from said stationary source to each of said plurality of pressure vessels and for collecting said gaseous natural gas stored in each of said plurality of pressure vessels in order to convey said gaseous natural gas stored in said plurality of pressure vessels to said carburetion means, said manifold means including an inlet port for receiving said gaseous natural gas from said stationary source, a bi-directional port for conveying said gaseous natural gas to and from said plurality of pressure vessels and an outlet port for conveying said gaseous natural gas in said pressure vessels to said carburetion means;
- means associated with said conveying means for controlling the flow of said gaseous natural gas from said storing means to said carburetion means of said engine;
- adsorbent filter means for adsorptively removing at least a portion of predetermined constitutents of said gaseous natural gas from the flow of said gaseous natural gas to said storing means, said adsorbent filter means being associated with said conveying means such that the flow of said gaseous natural gas from said storing means to said carburetion means also passes through said adsorbent filter means, said adsorbent filtering means desorptively re-introducing at least a portion of said predetermined constituents to the flow of said gaseous natural gas from said storing means to said carburetion means; and
- means for increasing the temperature of said adsorbent filter means when said gaseous natural gas is conveyed from said storing means to said carburetion means.

42. The natural gas powered vehicle according to claim 41, wherein the maximum pressure at which said natural gas is stored in said storing means is in the range of approximately 100 psig (689 kPa) to approximately 400 psig (2760 kPa).

43. The natural gas powered vehicle according to claim 42, wherein said engine includes turbocharging means for increasing the pressure of the intake air to said engine.

44. The natural gas powered vehicle according to claim 40, wherein said manifold means includes pressure relief means for substantially ensuring that the pressures in said vessels do not exceed a predetermined relief pressure.

45. The natural gas powered vehicle according to claim 40, wherein said temperature increasing means includes means for transferring a portion of the heat generated by said internal combustion engine to said adsorbent filter means.

* * * * *

UNITED STATES PATENT AND TRADEMARK OFFICE
CERTIFICATE OF CORRECTION

PATENT NO. : 4,523,548
DATED : June 18, 1985
INVENTOR(S) : Larry J. Engel and John W. Turko It is certified that error appears in the above-identified patent and that said Letters Patent is hereby corrected as shown below:

Column 2, line 55; "Robert a Clifton" should be --Robert A. Clifton--
Column 5, line 24; delete "a" (third occurrence)
Column 10, line 35; "234" should be --236--
Column 11, line 58; "282" should be --286--
Column 12, line 62; "vesses" should be --vessels--
Column 12, lines 62-63; "comparason" should be --comparison--
Column 13, line 18; "228" should be --328--
Column 14, line 24; "accummulation" should be --accumulation--
Column 14, line 62; "gaseoline" should be --gasolene--
Column 16, line 19; "4" should be --3--
Column 16, line 48; "2" should be --1--
Column 19, line 47; "incuding" should be --including--
Column 20, line 42; "40" should be --41--
Column 20, line 47; "40" should be --41--

Signed and Sealed this

Twelfth Day of August 1986

[SEAL]

Attest:

DONALD J. QUIGG

Attesting Officer

Commissioner of Patents and Trademarks